(12) United States Patent
Hong et al.

(10) Patent No.: US 11,930,189 B2
(45) Date of Patent: Mar. 12, 2024

(54) PARALLEL METADATA GENERATION BASED ON A WINDOW OF OVERLAPPED FRAMES

(71) Applicant: Samsung Electronics Co., Ltd., Suwon-si (KR)

(72) Inventors: Hunsop Hong, Irvine, CA (US); Seongnam Oh, Irvine, CA (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 190 days.

(21) Appl. No.: 17/491,120

(22) Filed: Sep. 30, 2021

(65) Prior Publication Data
US 2023/0095692 A1    Mar. 30, 2023

(51) Int. Cl.
*H04N 19/176* (2014.01)
*H04N 19/117* (2014.01)
*H04N 19/129* (2014.01)
*H04N 19/583* (2014.01)

(52) U.S. Cl.
CPC ......... *H04N 19/176* (2014.11); *H04N 19/117* (2014.11); *H04N 19/129* (2014.11); *H04N 19/583* (2014.11)

(58) Field of Classification Search
CPC .. H04N 19/177; H04N 19/115; H04N 19/436; H04N 21/8456; H04N 19/105; H04N 19/14; H04N 19/172; H04N 19/142; H04N 19/87; H04N 19/114; G06T 2207/10016; G06T 2207/30168;
(Continued)

(56) References Cited

U.S. PATENT DOCUMENTS

| 8,538,242 B2* | 9/2013 | Yeh, Jr. .............. G11B 27/3027 386/239 |
| 9,241,134 B2* | 1/2016 | Candelore .............. H04N 7/163 |
| 9,418,296 B1* | 8/2016 | Kansara ........... H04N 21/23418 |

(Continued)

OTHER PUBLICATIONS

International Search Report and Written Opinion dated Nov. 29, 2022 for International Application PCT/KR2022/012333, from Korean Intellectual Property Office, pp. 1-8, Republic of Korea.

*Primary Examiner* — Daniel Chang
(74) *Attorney, Agent, or Firm* — SHERMAN IP LLP; Kenneth L. Sherman; Hemavathy Perumal

(57) ABSTRACT

One embodiment provides a method comprising segmenting an input video into a first video chunk and one or more subsequent video chunks. The method further comprises, for each subsequent video chunk, generating a corresponding window of overlapped frames by selecting a subsequence of frames from a different video chunk immediately preceding the subsequent video chunk. The method further comprises generating metadata corresponding to each video chunk by processing each video chunk in parallel. Each subsequent video chunk is processed based in part on a corresponding window of overlapped frames. The method further comprises, for each subsequent video chunk, discarding a portion of metadata corresponding to the subsequent video chunk, where the portion discarded is specific to a corresponding window of overlapped frames. The method further comprises merging each video chunk into a single output video. Each video chunk merged is associated with any remaining corresponding metadata.

20 Claims, 9 Drawing Sheets

(58) Field of Classification Search
CPC .......... G06T 7/00; G06V 20/46; G06V 20/47; G06V 20/49
See application file for complete search history.

(56) References Cited

U.S. PATENT DOCUMENTS

| | | |
|---|---|---|
| 9,661,328 B2 | 5/2017 | Mccarthy et al. |
| 10,063,872 B2* | 8/2018 | Coward ................. H04N 19/90 |
| 10,348,981 B1* | 7/2019 | Bostick ................. H04N 5/272 |
| 10,902,601 B2 | 1/2021 | Gadgil et al. |
| 10,979,761 B2* | 4/2021 | Sekar ............... H04N 21/23418 |
| 2005/0028213 A1* | 2/2005 | Adler ................ H04N 21/472 |
| | | 386/E5.052 |
| 2007/0116277 A1* | 5/2007 | Ro ......................... H04N 19/70 |
| | | 375/E7.199 |
| 2007/0299870 A1* | 12/2007 | Finch ................ H04N 21/472 |
| 2009/0080405 A1* | 3/2009 | Lee .......................... H04W 4/06 |
| | | 370/349 |
| 2009/0115901 A1 | 5/2009 | Winter et al. |
| 2010/0329360 A1* | 12/2010 | Jung ..................... H04L 65/65 |
| | | 375/E7.076 |
| 2011/0305273 A1* | 12/2011 | He ....................... H04N 19/436 |
| | | 375/E7.154 |
| 2013/0145394 A1* | 6/2013 | Bakke ............. H04N 21/42224 |
| | | 725/38 |
| 2013/0336412 A1* | 12/2013 | Erofeev ............... G11B 27/031 |
| | | 375/E7.2 |
| 2014/0037011 A1* | 2/2014 | Lim ..................... H04N 19/513 |
| | | 375/240.16 |
| 2014/0185801 A1* | 7/2014 | Wang ............. H04N 21/440245 |
| | | 380/200 |
| 2014/0331137 A1* | 11/2014 | McKoen ................. G10L 15/26 |
| | | 715/719 |
| 2015/0077509 A1* | 3/2015 | Ben Natan ............ G10L 19/173 |
| | | 348/14.09 |
| 2015/0217196 A1* | 8/2015 | McCarthy ............... A63F 13/86 |
| | | 463/24 |
| 2015/0221337 A1* | 8/2015 | Kim ........................ H04N 5/77 |
| | | 386/224 |
| 2015/0339380 A1* | 11/2015 | Zhang ............... G06F 16/24578 |
| | | 707/769 |
| 2016/0036882 A1* | 2/2016 | Jin ......................... G06T 7/579 |
| | | 709/231 |
| 2016/0227232 A1* | 8/2016 | Choi ................... H04N 19/172 |
| 2016/0254028 A1* | 9/2016 | Atkins .................. G11B 27/28 |
| | | 386/241 |
| 2016/0366444 A1 | 12/2016 | Sullivan |
| 2017/0078574 A1* | 3/2017 | Puntambekar ..... H04N 23/6811 |
| 2017/0125063 A1 | 5/2017 | Atkins et al. |
| 2018/0139429 A1 | 5/2018 | Park et al. |
| 2018/0144692 A1 | 5/2018 | Atkins et al. |
| 2019/0052938 A1* | 2/2019 | Srinivasan ..... H04N 21/234345 |
| 2019/0180112 A1* | 6/2019 | Lee ......................... G06V 20/41 |
| 2020/0359000 A1 | 11/2020 | Shin et al. |
| 2020/0401615 A1 | 12/2020 | Raichelgauz et al. |
| 2021/0258632 A1* | 8/2021 | Hoffmann .......... H04N 21/6106 |

\* cited by examiner

810

- 811 Segmenting an input video into a first video chunk and one or more subsequent video chunks, where each video chunk comprises a sequence of frames

- 812 For each subsequent video chunk, generating a corresponding window of overlapped frames by selecting a subsequence of frames from a different video chunk immediately preceding the subsequent video chunk, wherein the subsequence of frames includes a last frame of the different video chunk, and the subsequence of frames represents the corresponding window of overlapped frames

- 813 Generating metadata corresponding to each video chunk by processing each video chunk in parallel, wherein each subsequent video chunk is processed based in part on a corresponding window of overlapped frames

- 814 For each subsequent video chunk, discarding a portion of metadata corresponding to the subsequent video chunk to obtain modified metadata corresponding to the subsequent video chunk, wherein the portion discarded is associated with a corresponding window of overlapped frames

- 815 Merging each video chunk into a single output video, wherein the first video chunk of the output video is associated with metadata corresponding to the first video chunk, and each subsequent video chunk of the output video is associated with modified metadata corresponding the subsequent video chunk

FIG. 8

PARALLEL METADATA GENERATION BASED ON A WINDOW OF OVERLAPPED FRAMES

TECHNICAL FIELD

One or more embodiments generally relate to scene adaptive metadata generation, in particular, a method and system of generating scene adaptive metadata in parallel using a window of overlapped frames.

BACKGROUND

Technologies for generating scene adaptive metadata provide a platform for producing high dynamic range (HDR) content with dynamic metadata. Some existing technologies adjust or change tone mapping curves (e.g., gamma curves) on a scene-by-scene basis. HDR10+ is an example existing technology that uses dynamic metadata for black level and peak brightness, which allows a different tone mapping curve for each scene.

Some existing technologies generate scene adaptive metadata by processing whole scene data. This is not suitable for time critical applications such as broadcasting where instantaneous generation of scene adaptive metadata is required.

Instantaneous generation of scene adaptive metadata involves abrupt adjustments/changes to tone mapping curves, resulting in issues such as flickering. To reduce or minimize flickering, instantaneous generation of scene adaptive metadata should include a smoothing operation, such as one based on infinite impulse response (IIR). By including a smoothing operation, frame data must be processed sequentially, thereby increasing processing time.

To reduce processing time incurred from processing frame data sequentially, a video may be cut into scene segments utilizing a scene change detector, and the resulting scene segments are then processed instantaneously in parallel. The resulting segment scenes, however, may be incorrect, resulting in flickering.

SUMMARY

One embodiment provides a method comprising segmenting an input video into a first video chunk and one or more subsequent video chunks. Each video chunk comprises a sequence of frames. The method further comprises, for each subsequent video chunk, generating a corresponding window of overlapped frames by selecting a subsequence of frames from a different video chunk immediately preceding the subsequent video chunk. The subsequence of frames includes a last frame of the different video chunk and represents the corresponding window of overlapped frames. The method further comprises generating metadata corresponding to each video chunk by processing each video chunk in parallel. Each subsequent video chunk is processed based in part on a corresponding window of overlapped frames. The method further comprises, for each subsequent video chunk, discarding a portion of metadata corresponding to the subsequent video chunk to obtain modified metadata corresponding to the subsequent video chunk. The portion discarded is associated with a corresponding window of overlapped frames. The method further comprises merging each video chunk into a single output video. The first video chunk of the output video is associated with metadata corresponding to the first video chunk. Each subsequent video chunk of the output video is associated with modified metadata corresponding to the subsequent video chunk.

Another embodiment provides a system comprising at least one processor and a non-transitory processor-readable memory device storing instructions that when executed by the at least one processor causes the at least one processor to perform operations. The operations include segmenting an input video into a first video chunk and one or more subsequent video chunks. Each video chunk comprises a sequence of frames. The operations further include, for each subsequent video chunk, generating a corresponding window of overlapped frames by selecting a subsequence of frames from a different video chunk immediately preceding the subsequent video chunk. The subsequence of frames includes a last frame of the different video chunk and represents the corresponding window of overlapped frames. The operations further include generating metadata corresponding to each video chunk by processing each video chunk in parallel. Each subsequent video chunk is processed based in part on a corresponding window of overlapped frames. The operations further include, for each subsequent video chunk, discarding a portion of metadata corresponding to the subsequent video chunk to obtain modified metadata corresponding to the subsequent video chunk. The portion discarded is associated with a corresponding window of overlapped frames. The operations further include merging each video chunk into a single output video. The first video chunk of the output video is associated with metadata corresponding to the first video chunk. Each subsequent video chunk of the output video is associated with modified metadata corresponding to the subsequent video chunk.

One embodiment provides a non-transitory processor-readable medium that includes a program that when executed by a processor performs a method comprising segmenting an input video into a first video chunk and one or more subsequent video chunks. Each video chunk comprises a sequence of frames. The method further comprises, for each subsequent video chunk, generating a corresponding window of overlapped frames by selecting a subsequence of frames from a different video chunk immediately preceding the subsequent video chunk. The subsequence of frames includes a last frame of the different video chunk and represents the corresponding window of overlapped frames. The method further comprises generating metadata corresponding to each video chunk by processing each video chunk in parallel. Each subsequent video chunk is processed based in part on a corresponding window of overlapped frames. The method further comprises, for each subsequent video chunk, discarding a portion of metadata corresponding to the subsequent video chunk to obtain modified metadata corresponding to the subsequent video chunk. The portion discarded is associated with a corresponding window of overlapped frames. The method further comprises merging each video chunk into a single output video. The first video chunk of the output video is associated with metadata corresponding to the first video chunk. Each subsequent video chunk of the output video is associated with modified metadata corresponding to the subsequent video chunk.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 8 is a flowchart of an example process for scene adaptive metadata generation, in one or more embodiments.

DETAILED DESCRIPTION

Figure 1:
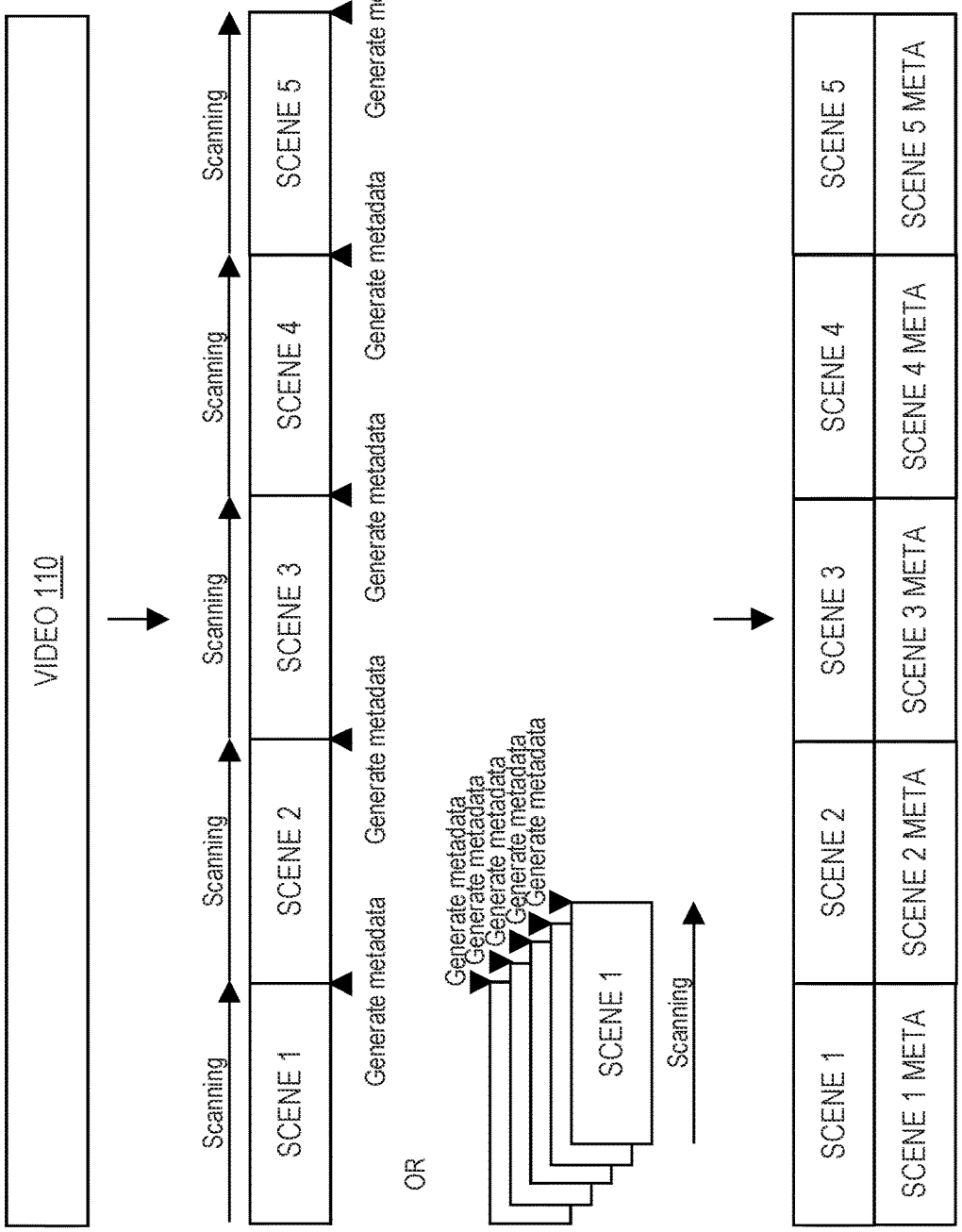
FIG. 1 illustrates a workflow of a first example conventional technology for scene adaptive metadata generation.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to scene adaptive metadata generation, in particular, a method and system of generating scene adaptive metadata in parallel using a window of overlapped frames. One embodiment provides a method comprising segmenting an input video into a first video chunk and one or more subsequent video chunks. Each video chunk comprises a sequence of frames. The method further comprises, for each subsequent video chunk, generating a corresponding window of overlapped frames by selecting a subsequence of frames from a different video chunk immediately preceding the subsequent video chunk. The subsequence of frames includes a last frame of the different video chunk and represents the corresponding window of overlapped frames. The method further comprises generating metadata corresponding to each video chunk by processing each video chunk in parallel. Each subsequent video chunk is processed based in part on a corresponding window of overlapped frames. The method further comprises, for each subsequent video chunk, discarding a portion of metadata corresponding to the subsequent video chunk to obtain modified metadata corresponding to the subsequent video chunk. The portion discarded is associated with a corresponding window of overlapped frames. The method further comprises merging each video chunk into a single output video. The first video chunk of the output video is associated with metadata corresponding to the first video chunk. Each subsequent video chunk of the output video is associated with modified metadata corresponding to the subsequent video chunk.

Another embodiment provides a system comprising at least one processor and a non-transitory processor-readable memory device storing instructions that when executed by the at least one processor causes the at least one processor to perform operations. The operations include segmenting an input video into a first video chunk and one or more subsequent video chunks. Each video chunk comprises a sequence of frames. The operations further include, for each subsequent video chunk, generating a corresponding window of overlapped frames by selecting a subsequence of frames from a different video chunk immediately preceding the subsequent video chunk. The subsequence of frames includes a last frame of the different video chunk and represents the corresponding window of overlapped frames. The operations further include generating metadata corresponding to each video chunk by processing each video chunk in parallel. Each subsequent video chunk is processed based in part on a corresponding window of overlapped frames. The operations further include, for each subsequent video chunk, discarding a portion of metadata corresponding to the subsequent video chunk to obtain modified metadata corresponding to the subsequent video chunk. The portion discarded is associated with a corresponding window of overlapped frames. The operations further include merging each video chunk into a single output video. The first video chunk of the output video is associated with metadata corresponding to the first video chunk. Each subsequent video chunk of the output video is associated with modified metadata corresponding to the subsequent video chunk.

One embodiment provides a non-transitory processor-readable medium that includes a program that when executed by a processor performs a method comprising segmenting an input video into a first video chunk and one or more subsequent video chunks. Each video chunk comprises a sequence of frames. The method further comprises, for each subsequent video chunk, generating a corresponding window of overlapped frames by selecting a subsequence of frames from a different video chunk immediately preceding the subsequent video chunk. The subsequence of frames includes a last frame of the different video chunk and represents the corresponding window of overlapped frames. The method further comprises generating metadata corresponding to each video chunk by processing each video chunk in parallel. Each subsequent video chunk is processed based in part on a corresponding window of overlapped frames. The method further comprises, for each subsequent video chunk, discarding a portion of metadata corresponding to the subsequent video chunk to obtain modified metadata corresponding to the subsequent video chunk. The portion discarded is associated with a corresponding window of overlapped frames. The method further comprises merging each video chunk into a single output video. The first video chunk of the output video is associated with metadata corresponding to the first video chunk. Each subsequent video chunk of the output video is associated with modified metadata corresponding to the subsequent video chunk.

FIG. 1 illustrates a workflow 100 of a first example conventional technology for scene adaptive metadata generation. The first example conventional technology is a conventional scene-based technology that is generally applicable to video on demand (VOD). VOD is a media distribution system that allows users to access videos without a traditional video playback device and the constraints of a typical static broadcasting schedule.

The first example conventional technology includes receiving an input video 110. The input video 110 does not include corresponding metadata. The input video 110 also does not include corresponding segmentation information for partitioning, segmenting, or splitting the input video 110 into scenes.

The first example conventional technology further includes either manually or automatically partitioning, segmenting, or splitting the input video 110 into one or more scenes (e.g., Scene 1, Scene 2, . . . , Scene 5). The input video 110 may be automatically partitioned, segmented, or split into the one or more scenes by applying a scene change detector or a scene detection algorithm to the input video 110 to perform scene detection (i.e., analysis of scenes). The one or more scenes together comprise frame data for the input video 110.

The first example conventional technology further includes generating scene adaptive metadata by processing the frame data sequentially. Processing the frame data sequentially comprises, for each scene of the one or more scenes, applying a metadata extraction algorithm to the scene to extract or generate corresponding metadata. The metadata extraction algorithm comprises scanning the scene from beginning to end of the scene to collect characteristics of the scene ("scene characteristics"), and extracting or generating the corresponding metadata at the end of the scanning based on the scene characteristics.

It is possible to process the frame data in parallel if the input video 110 is partitioned, segmented, or split into the one or more scenes based on one or more scene boundaries. However, if the entire input video 110 comprises only one scene (i.e., the scene lasts the entirety of the input video 110 or the size of the scene boundary is unlimited), processing the frame data in parallel is not possible as there is only one scene. Further, computational burden for scene detection is incurred.

The first example conventional technology further includes, for each scene of the one or more scenes, inserting corresponding metadata that was extracted or generated into the scene. The first example conventional technology further includes merging the one or more scenes with inserted metadata into a single video for output ("output video"). Each scene of the output video comprises corresponding metadata (e.g., Scene 1 meta is included with Scene 1, Scene 2 meta is included with Scene 2, . . . , Scene 5 meta is included with Scene 5) that together comprise scene adaptive metadata for the output video.

Figure 2:
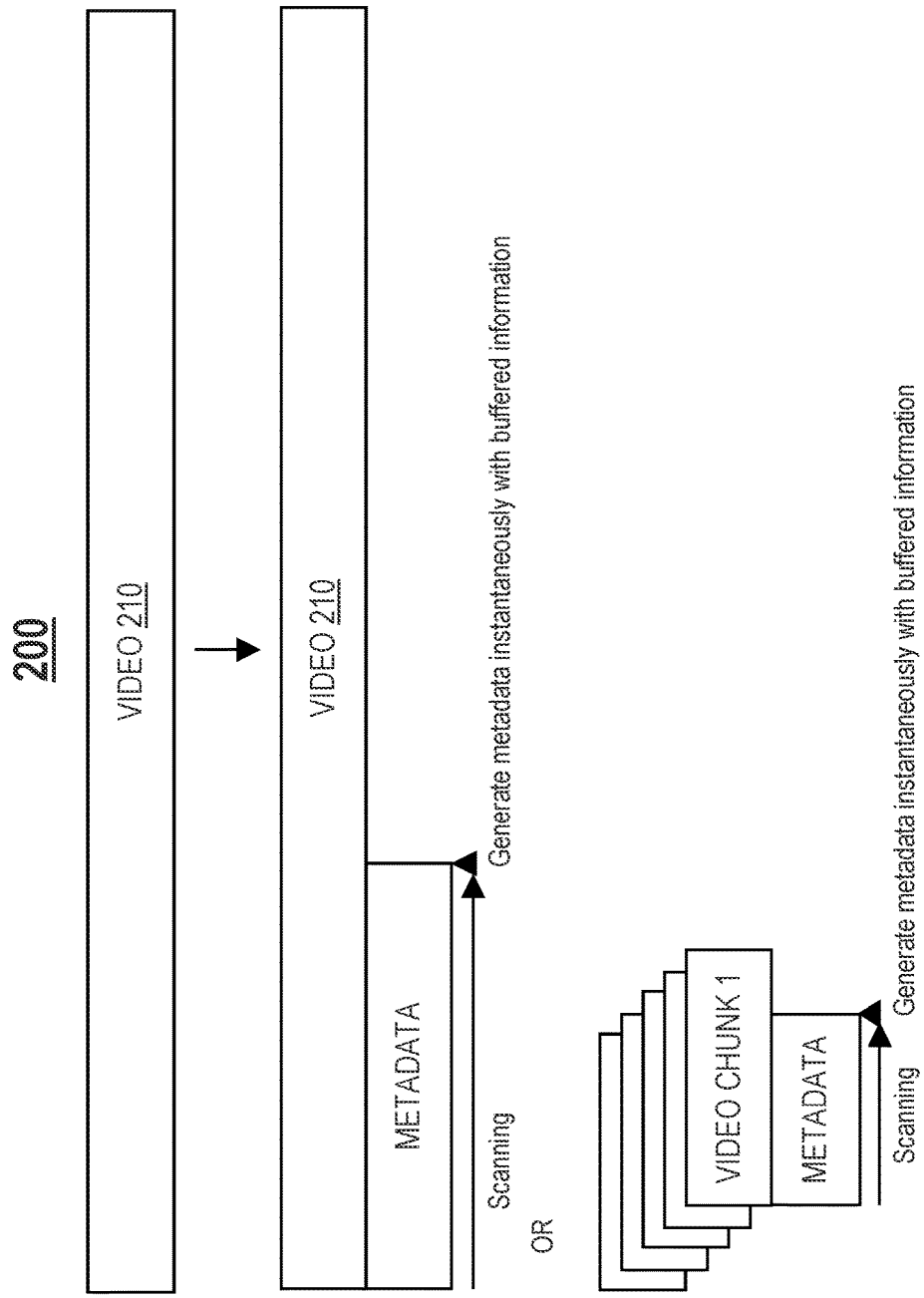
FIG. 2 illustrates workflow of a second example conventional technology for scene adaptive metadata generation.

FIG. 2 illustrates workflow 200 of a second example conventional technology for scene adaptive metadata generation. The second example conventional technology is generally applicable to over the top (OTT) services and encoder services. OTT services refer to any type of video or streaming media that provides a user access to media by sending the media directly through the internet. Compared to conventional scene-based technology, the second example conventional technology does not involve manually or automatically (via scene detection) segmenting a video into scenes, thereby increasing processing speed (i.e., reducing processing time).

The second example conventional technology includes receiving an input video 210. The input video 210 does not include corresponding metadata. The input video 210 also does not include corresponding segmentation information for partitioning, segmenting, or splitting the input video 210 into scenes.

The second example conventional technology further includes generating scene adaptive metadata by scanning the input video 210 and instantaneously generating corresponding metadata with buffered information as the input video 210 is scanned.

Scanning the input video 210 comprises either scanning frames of the input video 210 sequentially from beginning to end, or scanning video chunks of the input video 210 in parallel, wherein each video chunk is of a pre-determined fixed size (i.e., comprises a pre-determined number of frames). As the input video 210 is not partitioned, segmented, or split into scenes based on scene characteristics, issues such as flashing may arise as a scene boundary may be in a middle of a video chunk, resulting in an abrupt transition visual artifact when a display device displays the input video 210 based on the corresponding metadata generated.

The second example conventional technology requires a full playback device in order to get metadata and requires full play time to get final metadata for the input video 210. The second example conventional technology is suitable for real-time broadcasting system with some acceptable level of quality degradation, but not for VOD systems.

Figure 3:
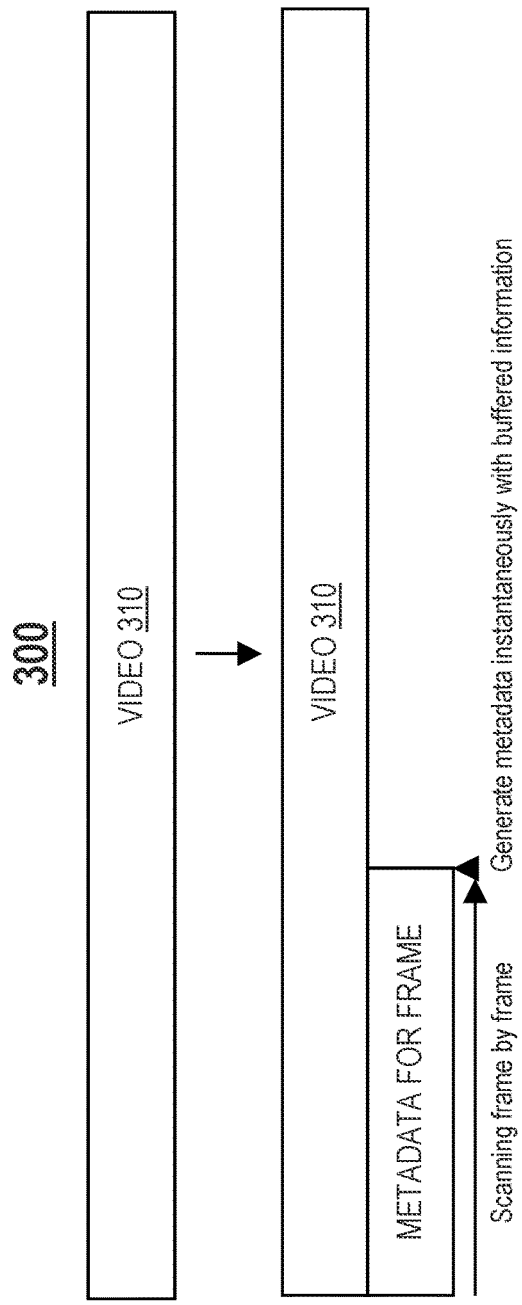
FIG. 3 illustrates workflow of a third example conventional technology for scene adaptive metadata generation.

FIG. 3 illustrates workflow 300 of a third example conventional technology for scene adaptive metadata generation. The third example conventional technology is generally applicable to real-time broadcasting systems or service providers that do not have enough time for pre-processing.

The third example conventional technology includes receiving an input video 310. The input video 310 does not include corresponding metadata. The input video 310 also does not include corresponding segmentation information for partitioning, segmenting, or splitting the input video 310 into scenes.

The third example conventional technology further includes scanning each frame (or a small number of frames) of the input video 310 and instantaneously generating, for the frame (or the small number of frames), corresponding metadata with buffered information. The third example conventional technology is suitable for real-time systems that can input one frame and output one frame (e.g., implemented inside a device that instantaneously generates, for each input frame received, corresponding metadata). Such systems, however, are expensive.

One or more embodiments provide a platform for parallel generation of scene adaptive metadata in real-time. Unlike some conventional technologies, the platform facilitates fast generation of the metadata without flickering.

Figure 4:
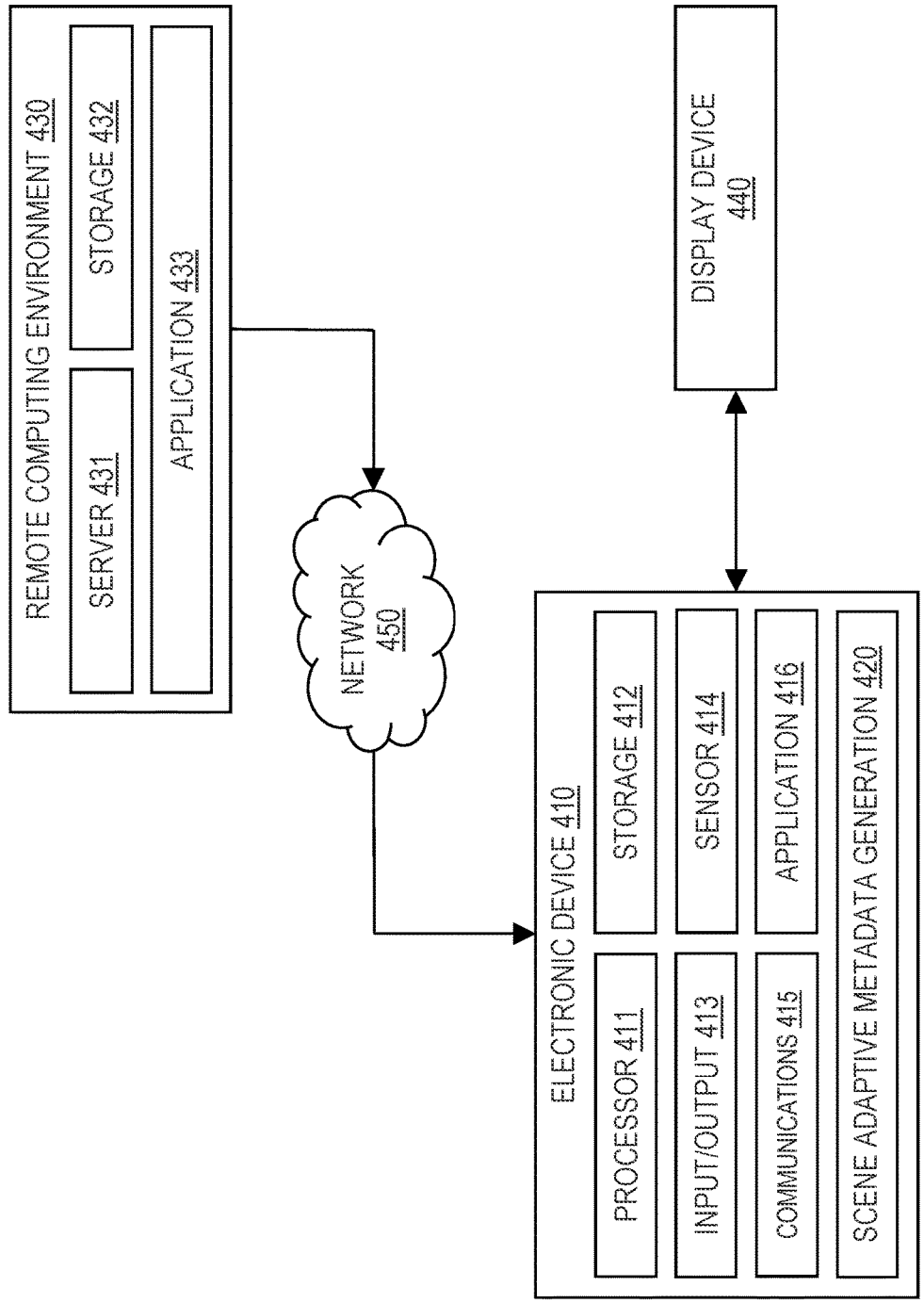
FIG. 4 is an example computing architecture for scene adaptive metadata generation, in one or more embodiments.

FIG. 4 is an example computing architecture 400 for scene adaptive metadata generation, in one or more embodiments. The computing architecture 400 comprises an electronic device 410 including resources, such as one or more processor units 411 and one or more storage units 412. One or more applications may execute/operate on the electronic device 410 utilizing the resources of the electronic device 410.

In one embodiment, the one or more applications on the electronic device 410 include a scene adaptive metadata generation system 420 that provides a parallelized instantaneous solution for generating scene adaptive metadata. The system 420 is configured to: (1) receive an input video (e.g., a high dynamic range (HDR) video), (2) partition, segment, or split the input video into a plurality of video chunks, wherein each video chunk includes a sequence of frames (e.g., image/video frames, such as HDR frames), and at least one video chunk has a corresponding window of overlapped frames comprising one or more frames that overlaps with one or more frames of another video chunk, (3) instantaneously generate metadata corresponding to each video chunk in parallel, (4) insert, append, or tag at least a portion of metadata corresponding to each video chunk to the video chunk, and (5) merge together each video chunk, including metadata inserted, appended, or tagged to the video chunk, into a single output video. In one embodiment, the output video is provided to a display device (e.g., a HDR rendering display/device) 440 integrated in or coupled to the electronic device 410 for presentation.

In one embodiment, metadata inserted, appended, or tagged to a video chunk comprises per frame or scene information for the video chunk.

Examples of an electronic device 410 include, but are not limited to, a television (e.g., a smart television), a mobile electronic device (e.g., an optimal frame rate tablet, a smart phone, a laptop, etc.), a wearable device (e.g., a smart watch, a smart band, a head-mounted display, smart glasses, etc.), a gaming console, a video camera, a media playback device (e.g., a DVD player), a set-top box, an Internet of things (IoT) device, a cable box, a satellite receiver, etc.

In one embodiment, the electronic device 410 comprises one or more sensor units 414 integrated in or coupled to the electronic device 410, such as a camera, a microphone, a GPS, a motion sensor, etc.

In one embodiment, the electronic device 410 comprises one or more input/output (I/O) units 413 integrated in or coupled to the electronic device 410. In one embodiment, the one or more I/O units 413 include, but are not limited to, a physical user interface (PUI) and/or a graphical user interface (GUI), such as a keyboard, a keypad, a touch interface, a touch screen, a knob, a button, a display screen, etc. In one embodiment, a user can utilize at least one I/O unit 413 to configure one or more user preferences, configure one or more parameters (e.g., pre-determined number of frames, pre-determined fixed size), provide user input, etc.

In one embodiment, the one or more applications on the electronic device 410 may further include one or more software mobile applications 416 loaded onto or downloaded to the electronic device 410, such as a camera application, a social media application, a video streaming application, etc. A software mobile application 416 on the electronic device 410 may exchange data with the scene adaptive metadata generation system 420.

In one embodiment, the electronic device 410 comprises a communications unit 415 configured to exchange data with the display device 440 (e.g., receiving one or more display characteristics of the display device 440, such as display frame rate). The communications unit 415 is further configured to exchange data with a remote computing environment, such as a remote computing environment 430 (e.g., receiving input video from the remote computing environment 430), over a communications network/connection 450 (e.g., a wireless connection such as a Wi-Fi connection or a cellular data connection, a wired connection, or a combination of the two). The communications unit 415 may comprise any suitable communications circuitry operative to connect to a communications network and to exchange communications operations and media between the electronic device 410 and other devices connected to the same communications network 450. The communications unit 415 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 430 includes resources, such as one or more servers 431 and one or more storage units 432. One or more applications 433 that provide higher-level services may execute/operate on the remote computing environment 430 utilizing the resources of the remote computing environment 430.

In one embodiment, a remote computing environment 430 provides an online platform for hosting one or more online services (e.g., a video streaming service, etc.) and/or distributing one or more software mobile applications 416. For example, the scene adaptive metadata generation system 420 may be loaded onto or downloaded to the electronic device 410 from a remote computing environment 430 that maintains and distributes updates for the system 420. As another example, a remote computing environment 430 may comprise a cloud computing environment providing shared pools of configurable computing system resources and higher-level services.

In one embodiment, the scene adaptive metadata generation system 420 is integrated into, or implemented as part of, a VOD system.

Figure 5:
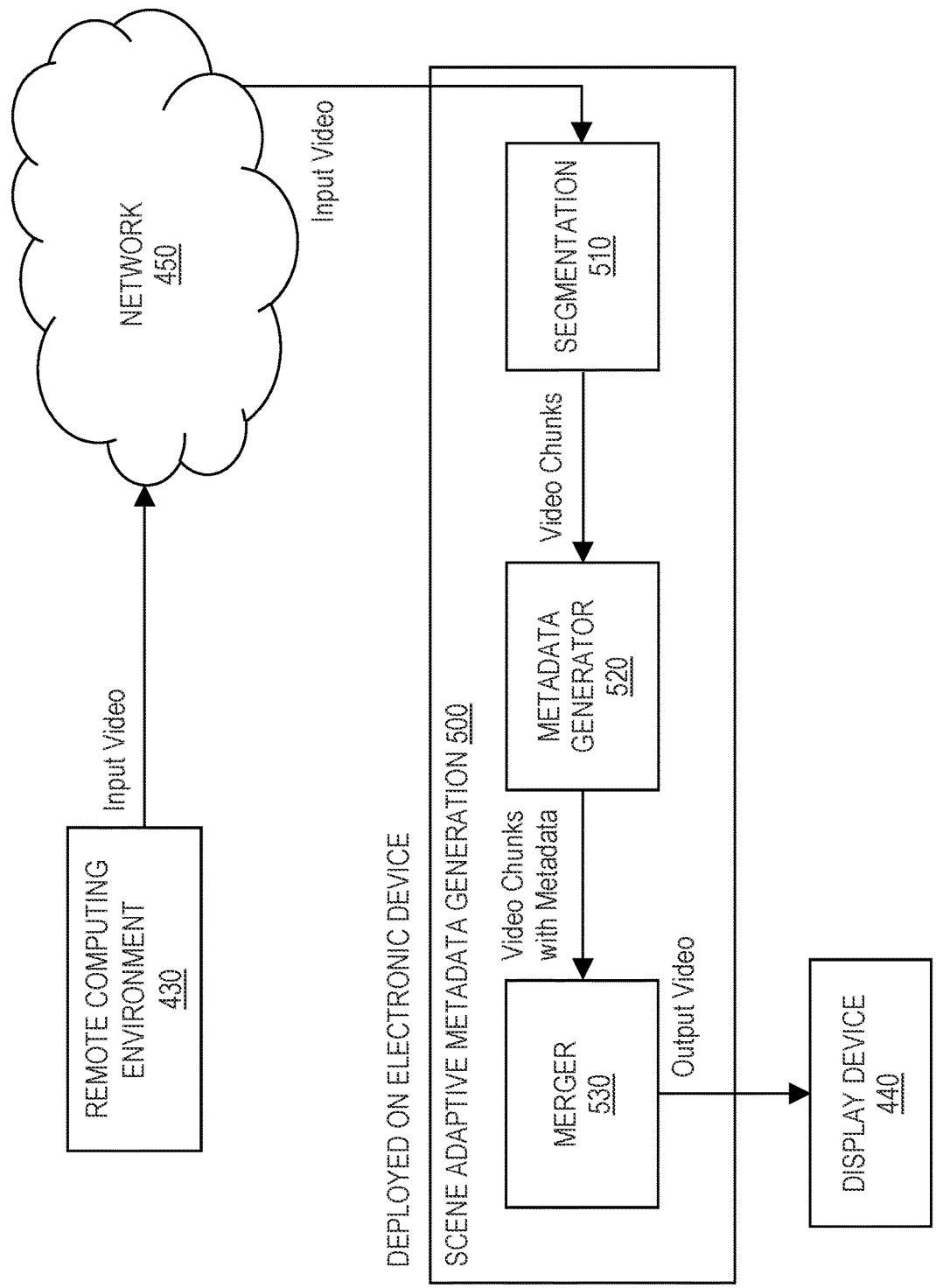
FIG. 5 illustrates an example scene adaptive metadata generation system, in one or more embodiments.

FIG. 5 illustrates an example scene adaptive metadata generation system 500, in one or more embodiments. In one embodiment, the scene adaptive metadata generation system 420 in FIG. 4 is implemented as the scene adaptive metadata generation system 500. In one embodiment, the system 500 comprises a segmentation unit 510 configured to: (1) receive an input video (e.g., from the remote computing environment 430, via the network 450), and (2) partition, segment, or split the input video into a plurality of video chunks. Each video chunk includes a sequence of frames.

In one embodiment, the segmentation unit 510 partitions, segments, or splits the input video as follows: First, the segmentation unit 510 partitions, segments, or splits the input video into a sequence of video chunks including a first video chunk and one or more subsequent video chunks, wherein the first video chunk is at a start of the sequence of video chunks. Next, for each subsequent video chunk, the segmentation unit 510 generates a corresponding window of overlapped frames by: (1) selecting a subsequence of frames from a different video chunk immediately preceding the subsequent video chunk ("immediately preceding video chunk"), where the subsequence of frames selected represents an ending portion (i.e., an area or region forming an end) of the immediately preceding video chunk and includes a last frame of the immediately preceding video chunk, and (2) appends the subsequence of frames selected to a beginning of the subsequent video chunk (i.e., immediately prior to a first frame of the subsequent video chunk), where the subsequence of frames appended represents the corresponding window of overlapped frames. Together, a subsequent video chunk and a corresponding window of overlapped frames appended to a beginning of the subsequent video chunk represent an extended version of the subsequent video chunk (i.e., an extended video chunk). The plurality of video chunks provided by the segmentation unit 510 include the first video chunk and each extended version of each subsequent video chunk.

For each subsequent video chunk, a corresponding window of overlapped frames represents an area or region of frames that overlaps with an ending portion of an immediately preceding video chunk that includes a last frame of the immediately preceding video chunk. For each subsequent video chunk, a corresponding window of overlapped frames and an ending portion of an immediately preceding video chunk share an area or region of frames (i.e., the same frames).

In one embodiment, each window of overlapped frames is of a pre-determined fixed size.

In on embodiment, the system 500 comprises a metadata generator unit 520 configured to: (1) receive the plurality of video chunks including the first video chunk and each extended version of each subsequent video chunk (e.g., from the segmentation unit 510), and (2) generate scene adaptive metadata corresponding to the input video by processing the video chunks in parallel (i.e., parallel processing), resulting in a plurality of processed video chunks. In one embodiment, processing the video chunks in parallel comprises: (1) scanning each video chunk in parallel, and (2) during the scanning, instantaneously generating metadata (e.g., HDR10+ dynamic metadata) with buffered information corresponding to each video chunk in parallel. Scanning each video chunk in parallel comprises: (1) scanning the first video chunk from beginning to end (i.e., from a first frame to a last frame of the first video chunk), and (2) for each subsequent video chunk, scanning an extended version of the subsequent video chunk from beginning to end, i.e., scanning a corresponding window of overlapped frames included in the extended version from beginning to end (i.e., from a first frame to a last frame of the corresponding window) followed by scanning the subsequent video chunk itself from beginning to end (i.e., from a first frame to a last frame of the subsequent video chunk). As each video chunk is scanned, corresponding dynamic metadata with buffered information is generated in real-time.

In one embodiment, the scanning involves applying a metadata extraction algorithm to each video chunk to collect one or more scene characteristics of one or more scenes included in the video chunk. As each video chunk is scanned, corresponding dynamic metadata is generated in real-time based on one or more scene characteristics collected from the video chunk.

In one embodiment, to reduce or minimize flickering resulting from instantaneous generation of metadata, processing the video chunks in parallel further comprises applying a smoothing operation to the first video chunk and each extended version of each subsequent video chunk. For example, in one embodiment, the smoothing operation comprises an infinite impulse response (IIR) filter. As another example, in one embodiment, the smoothing operation comprises a combination of a finite impulse response (FIR) and a IIR filter (e.g., $y[n]=(6*y[n-1]+x[n]+x[n-1]+x[n-2]+x[n-3])/10$, wherein n denotes a total number of video chunks, $y[n]$ denotes an output video, and $x[n]$ denotes an input video).

In one embodiment, processing the video chunks in parallel further comprises, for each video chunk, inserting, appending, or tagging at least a portion of corresponding metadata to the video chunk, resulting in a processed video chunk. Any metadata inserted, appended, or tagged to a video chunk represents scene adaptive metadata corresponding to the video chunk. Each processed video chunk includes corresponding scene adaptive metadata.

For example, in one embodiment, for the first video chunk, the metadata generator unit 520 is configured to insert, append, or tag all corresponding metadata to the first video chunk, resulting in a first processed video chunk. For each subsequent video chunk, the metadata generator unit 520 is configured to: (1) identify a portion of corresponding metadata that is associated with/specific to a corresponding window of overlapped frames included in an extended version of the subsequent video chunk (e.g., the portion identified was generated based on one or more scene characteristics collected or extracted from the corresponding window), (2) discard or remove the portion identified from the corresponding metadata, and (3) insert, append, or tag any remaining corresponding metadata (i.e., the corresponding metadata excluding the portion identified) to the subsequent video chunk, resulting in a subsequent processed video chunk. Therefore, for each subsequent video chunk, the metadata generator unit 520 discards or removes a portion of corresponding metadata that is associated with/specific to frames that overlap with an ending portion of an immediately preceding video chunk (i.e., frames included in a corresponding window of overlapped frames), thereby preventing repetition of metadata across the video chunks (i.e., the portion is inserted, appended, or tagged to only the immediately preceding video chunk). The plurality of processed video chunks provided by the metadata generator unit 520 include: (1) the first processed video chunk comprising the first video chunk and corresponding scene adaptive metadata, and (2) each subsequent processed video chunk, wherein each subsequent processed video chunk comprises a subsequent video chunk and corresponding scene adaptive metadata. Each subsequent processed video chunk does not include a corresponding window of overlapped windows (i.e., frames that overlap with an ending portion of an immediately preceding video chunk) and metadata associated with/specific to the corresponding window.

In one embodiment, the system 500 further comprises a merger unit 530 configured to: (1) receive the plurality of processed video chunks including the first processed video chunk and each subsequent processed video chunk (e.g., from the metadata generator unit 520), and (2) merge the processed video chunks into a single output video. In one embodiment, the output video is provided to a display device 440 (FIG. 4) integrated in or coupled to an electronic device 410 (FIG. 4) for presentation.

Presenting a video on a display device 440 requires HDR tone mapping. HDR tone mapping is a process that is necessary to resolve differences between a maximum luminance level/value of the video and a maximum luminance level/value of the display device 440. To preserve creative intent of a creator of the video, HDR tone mapping requires dynamic metadata for use as a guide. While generating dynamic metadata for a subsequent video chunk, the metadata generator unit 520 utilizes a corresponding window of overlapped frames to reference a subsequence of frames at an end (i.e., ending portion) of an immediately preceding video chunk and determine characteristic or stochastic information, such as historical information relating to the immediately preceding video chunk (e.g., per frame or scene information for the immediately preceding video chunk). The stochastic information in turn may be used to eliminate visual artifacts, such as flickering, in the subsequent video chunk during HDR tone mapping (e.g., used for smoothness treatment of the subsequent video chunk).

The system 500 generates metadata for the video chunks in parallel and in real-time. By utilizing a window of overlapped frames and a smoothing operation (e.g., IIR filtering) during generation of scene adaptive metadata, the system 500 supports gradual ramp up, catches up with changes in metadata values, and mitigates effects of sudden changes in the metadata values. Unlike frame-based conventional technologies, utilizing a window of overlapped frames and a smoothing operation enables the system 500 to reduce or minimize visual artifacts such as flickering. Unlike scene-based conventional technologies, the system 500 reduces or minimizes a number of frames required for generation of scene adaptive metadata without incurring visual artifacts such as flickering. By utilizing parallel processing, the system 500 provides a fast solution for scene adaptive metadata generation in which speed of processing is accelerated. The system 500 rapidly speeds up generation of dynamic metadata via parallel processing, and preserves quality of the dynamic metadata generated (i.e., no degradation in the quality of the dynamic metadata) utilizing a window of overlapped frames and a smoothing operation, thereby preventing visual artifacts such as flickering.

For example, assume a video is 60 minutes long with twenty scenes, where a maximum scene length is 10 minutes and a minimum scene length is 1 minute. Assume time to perform scene detection ("scene detection time") on the video is 60 minutes, and time to process ("processing time") a scene is equal to a length of the scene multiplied by a factor of 2. If a conventional scene-based technology is applied to the video to generate scene adaptive metadata for each scene in sequence, the total amount of time to generate the scene adaptive metadata is equal to the sum of the total processing time and the scene detection time, i.e., (60 minutes×2)+60 minutes=120 minutes+60 minutes=180 minutes. If a conventional scene-based technology is applied to the video to generate scene adaptive metadata for each scene in parallel, the total amount of time to generate the scene adaptive metadata is equal to the sum of the longest processing time for a scene and the scene detection time, i.e., (10 minutes× 2)+60 minutes=20 minutes+60 minutes=80 minutes. In one embodiment, if the system 500 is used to generate scene adaptive metadata for the same video, the system 500 partitions, segments, or splits the video into a plurality of video chunks, where each subsequent video chunk is 10 seconds in length and a corresponding window of overlapped frames is 2 seconds in length (i.e., an extended version of the subsequent video chunk is 12 seconds in length). Via the system 500, the total amount of time to generate scene adaptive metadata for the video chunks in parallel is equal to the processing time for a subsequent video chunk, i.e., 12 seconds×2=24 seconds.

Therefore, compared to conventional technologies, generation of scene adaptive metadata via the system 500 is rapidly sped up, thereby making the system 500 suitable for time-critical applications such as broadcast stations where there may not be enough time for scene-based processing. Further, the system 500 is scalable and can utilize as many resources (e.g., CPUs or other machines) as needed for rapid generation of scene adaptive metadata, thereby making the system 500 an ideal solution for OTT service providers and/or cloud service providers.

Figure 6:
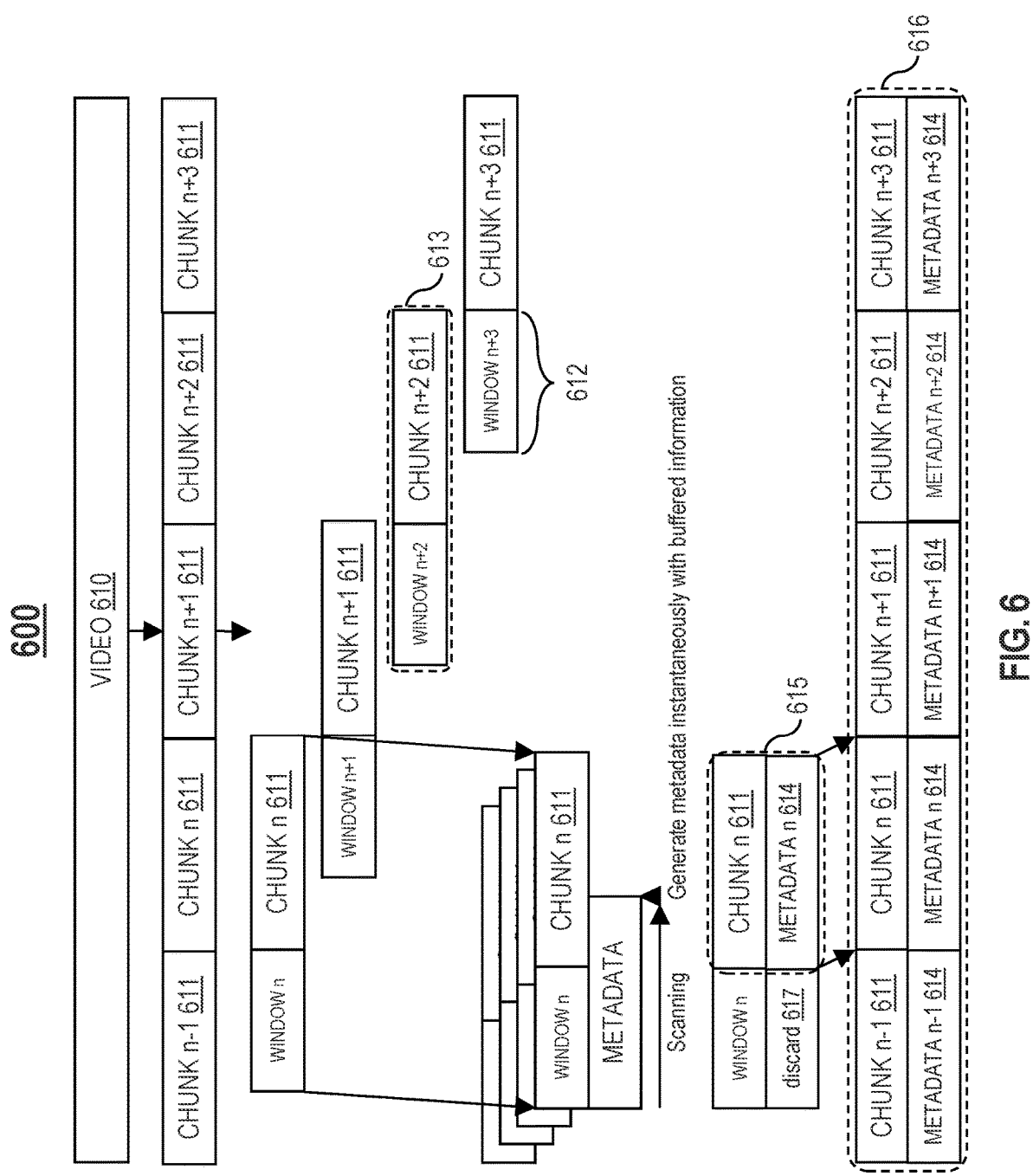
FIG. 6 illustrates an example workflow of the scene adaptive metadata generation system, in one or more embodiments.

FIG. 6 illustrates an example workflow 600 of the scene adaptive metadata generation system 500, in one or more embodiments. In one embodiment, the system 500 partitions, segments, or splits, via the segmentation unit 510, an input video 610 into a sequence of video chunks 611 including a first video chunk 611 and one or more subsequent video chunks 611.

For example, as shown in FIG. 6, the sequence of video chunks 611 includes the following video chunks 611 in order: CHUNK n−1, CHUNK n, CHUNK n+1, CHUNK n+2, and CHUNK n+3, wherein n is a positive integer. CHUNK n−1 represents the first video chunk 611, and CHUNK n, CHUNK n+1, CHUNK n+2, and CHUNK n+3 each represent a subsequent video chunk 611.

For each subsequent video chunk 611, the system 500 generates, via the segmentation unit 510, a corresponding window 612 of overlapped frames that is appended to a beginning of the subsequent video chunk 611, resulting in an extended version 613 of the subsequent video chunk 611. For example, as shown in FIG. 6, a beginning of CHUNK n is appended with a WINDOW n of overlapped frames comprising a subsequence of frames selected from an ending portion of CHUNK n−1, a beginning of CHUNK n+1 is appended with a WINDOW n+1 of overlapped frames comprising a subsequence of frames selected from an ending portion of CHUNK n, a beginning of CHUNK n+2 is appended with a WINDOW n+2 of overlapped frames comprising a subsequence of frames selected from an ending portion of CHUNK n+1, and a beginning of CHUNK n+3 is appended with a WINDOW n+3 of overlapped frames comprising a subsequence of frames selected from an ending portion of CHUNK n+2.

The system 500 processes, via the metadata generator unit 520, the first video chunk 611 and each extended version 613 of each subsequent video chunk 611 in parallel (i.e., parallel processing). The parallel processing comprises: (1) scanning the first video chunk 611 and each extended version 613 of each subsequent video chunk 611 in parallel, and (2) during the scanning, instantaneously generating metadata with buffered information corresponding to each video chunk 611 in parallel.

The parallel processing further comprises, for each video chunk 611, inserting, appending, or tagging at least a portion of corresponding metadata to the video chunk 611, resulting in a processed video chunk 615. Any metadata inserted, appended, or tagged to a video chunk 611 represents corresponding scene adaptive metadata 614.

For example, as shown in FIG. 6, all metadata corresponding to CHUNK n−1 is inserted, appended, or tagged to CHUNK n−1 as METADATA n−1. A portion 617 of metadata corresponding to CHUNK n that is associated with/specific to WINDOW n of overlapped frames is discarded or removed, and any remaining corresponding metadata 614 is inserted, appended, or tagged to CHUNK n as METADATA n. A portion of metadata corresponding to CHUNK n+1 that is associated with/specific to WINDOW n+1 of overlapped frames is discarded or removed, and any remaining corresponding metadata is inserted, appended, or tagged to CHUNK n+1 as METADATA n+1. A portion of metadata corresponding to CHUNK n+2 that is associated with/specific to WINDOW n+2 of overlapped frames is discarded or removed, and any remaining corresponding metadata is inserted, appended, or tagged to CHUNK n+2 as METADATA n+2. A portion of metadata corresponding to CHUNK n+3 that is associated with/specific to WINDOW n+3 of overlapped frames is discarded or removed, and any remaining corresponding metadata is inserted, appended, or tagged to CHUNK n+3 as METADATA n+3.

The system 500 merges, via the merger unit 530, all processed video chunks 615 into a single output video 616.

Figure 7:
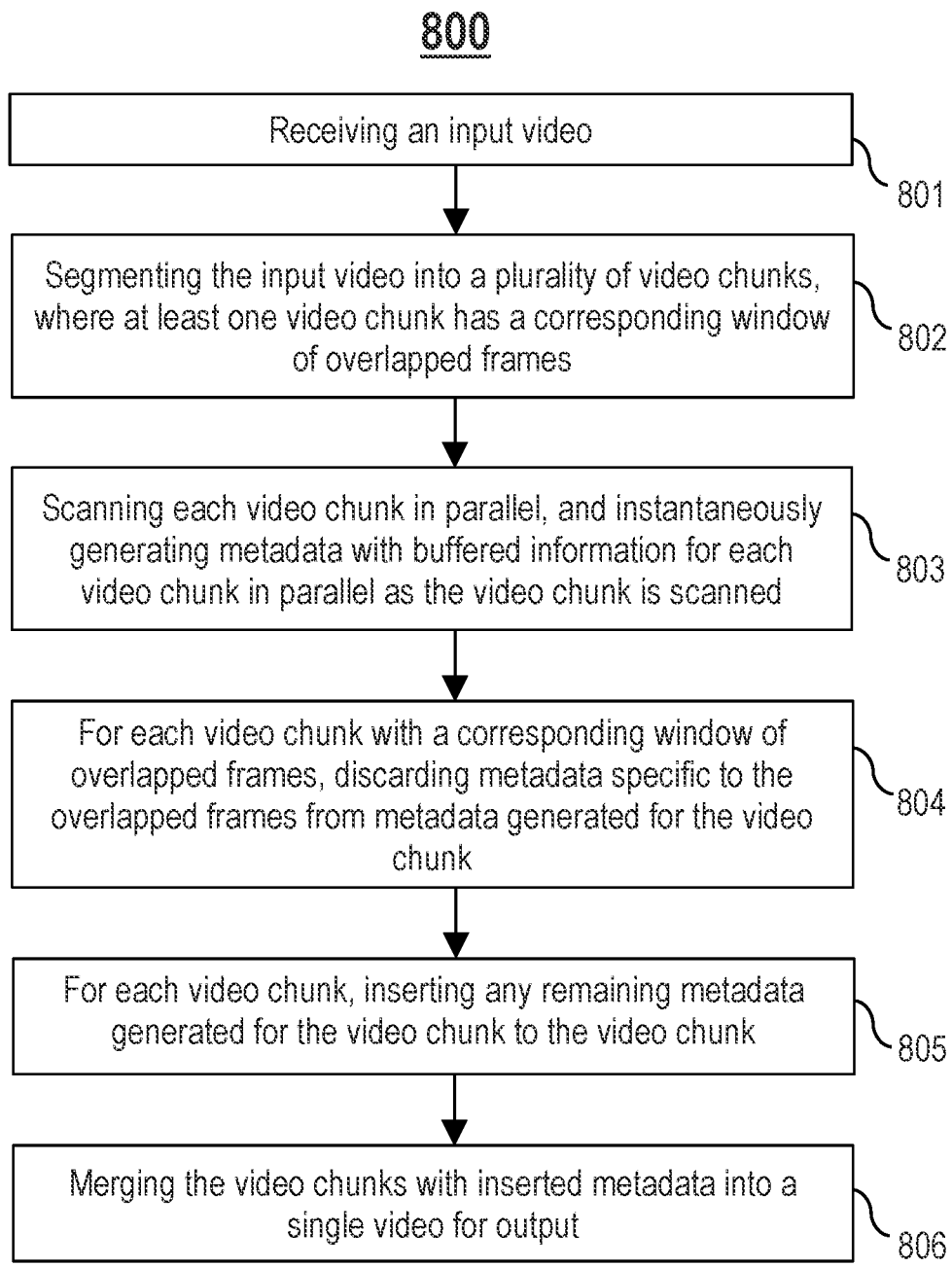
FIG. 7 is a flowchart of an example process for scene adaptive metadata generation, in one or more embodiments.

FIG. 7 is a flowchart of an example process 800 for scene adaptive metadata generation, in one or more embodiments. Process block 801 includes receiving (e.g., via the segmentation unit 510) an input video (e.g., input video 610). Process block 802 includes segmenting (e.g., via the segmentation unit 510) the input video into a plurality of video chunks (e.g., video chunks 611), where at least one video chunk has a corresponding window of overlapped frames (e.g., window 612 of overlapped frames). Process block 803 includes scanning (e.g., via the metadata generator unit 520) each video chunk in parallel, and instantaneously generating (e.g., via the metadata generator unit 520) metadata with buffered information for each video chunk in parallel as the video chunk is scanned. Process 804 includes, for each video chunk with a corresponding window of overlapped frames, discarding (e.g., via the metadata generator unit 520) metadata specific to the overlapped frames from metadata generated for the video chunk. Process 805 includes, for each video chunk, inserting any remaining metadata (e.g., metadata 614) generated for the video chunk to the video chunk. Process 806 includes merging (e.g., via the merger unit 530)

the video chunks with inserted metadata into a single video for output (e.g., output video 616).

In one embodiment, process blocks 801-806 may be performed by one or more components of the scene adaptive metadata generation system 500.

FIG. 8 is a flowchart of an example process 810 for scene adaptive metadata generation, in one or more embodiments. Process block 811 includes segmenting (e.g., via the segmentation unit 510) an input video (e.g., input video 610) into a first video chunk and one or more subsequent video chunks (e.g., video chunks 611), where each video chunk comprises a sequence of frames. Process block 812 includes for each subsequent video chunk, generating (e.g., via the segmentation unit 510) a corresponding window of overlapped frames (e.g., window 612 of overlapped frames) by selecting a subsequence of frames from a different video chunk immediately preceding the subsequent video chunk, where the subsequence of frames includes a last frame of the different video chunk, and the subsequence of frames represents the corresponding window of overlapped frames. Process block 813 includes generating (e.g., via the metadata generator unit 520) metadata corresponding to each video chunk by processing each video chunk in parallel, where each subsequent video chunk is processed based in part on a corresponding window of overlapped frames. Process 814 includes, for each subsequent video chunk, discarding (e.g., via the metadata generator unit 520) a portion of metadata corresponding to the subsequent video chunk to obtain modified metadata (e.g., metadata 614) corresponding to the subsequent video chunk, where the portion discarded is associated with a corresponding window of overlapped frames. Process 815 includes merging (e.g., via the merger unit 530) each video chunk into a single output video (e.g., output video 616), where the first video chunk of the output video is associated with metadata corresponding to the first video chunk, and each subsequent video chunk of the output video is associated with modified metadata corresponding the subsequent video chunk.

In one embodiment, process blocks 811-815 may be performed by one or more components of the scene adaptive metadata generation system 500.

Figure 9:
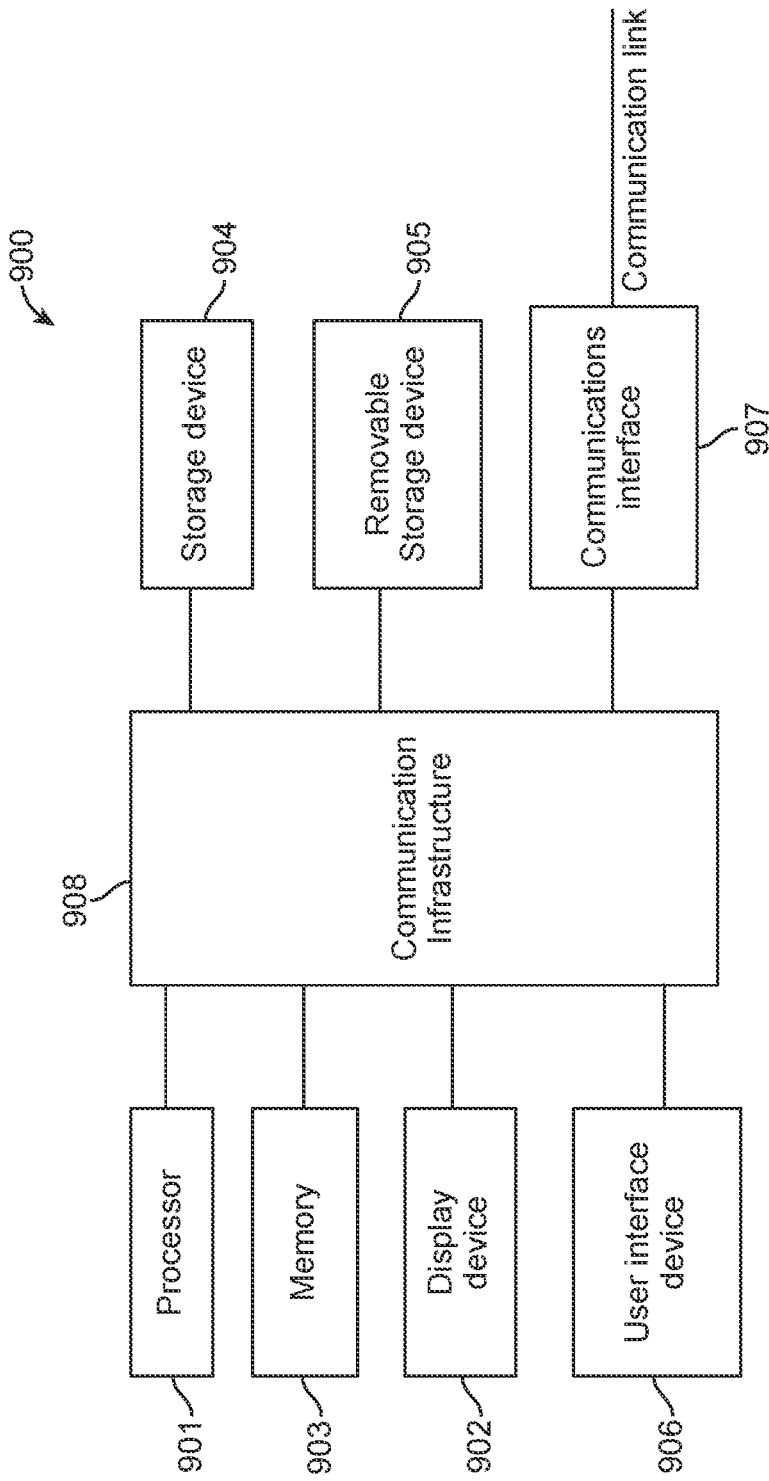
FIG. 9 is a high-level block diagram showing an information processing system comprising a computer system useful for implementing the disclosed embodiments.

FIG. 9 is a high-level block diagram showing an information processing system comprising a computer system 900 useful for implementing the disclosed embodiments. The systems 420 and 500 may be incorporated in the computer system 900. The computer system 900 includes one or more processors 901, and can further include an electronic display device 902 (for displaying video, graphics, text, and other data), a main memory 903 (e.g., random access memory (RAM)), storage device 904 (e.g., hard disk drive), removable storage device 905 (e.g., removable storage drive, removable memory module, a magnetic tape drive, optical disk drive, computer readable medium having stored therein computer software and/or data), viewer interface device 906 (e.g., keyboard, touch screen, keypad, pointing device), and a communication interface 907 (e.g., modem, a network interface (such as an Ethernet card), a communications port, or a PCMCIA slot and card). The communication interface 907 allows software and data to be transferred between the computer system and external devices. The system 900 further includes a communications infrastructure 908 (e.g., a communications bus, cross-over bar, or network) to which the aforementioned devices/modules 901 through 907 are connected.

Information transferred via communications interface 907 may be in the form of signals such as electronic, electromagnetic, optical, or other signals capable of being received by communications interface 907, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 800 (FIG. 7) and/or process 810 (FIG. 8) may be stored as program instructions on the memory 903, storage device 904, and/or the removable storage device 905 for execution by the processor 901.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   segmenting an input video into a first video chunk and one or more subsequent video chunks, wherein each video chunk comprises a sequence of frames;
   for each subsequent video chunk, selecting a subsequence of frames from a different video chunk immediately preceding the subsequent video chunk and appending the subsequence of frames to a beginning of the subsequent video chunk to form an extended version of the subsequent video chunk, wherein the subsequence of frames includes a last frame of the different video chunk, and the subsequence of frames represents a corresponding window of overlapped frames;

generating metadata corresponding to each video chunk by processing each video chunk in parallel, wherein each subsequent video chunk is processed by scanning an extended version of the subsequent video chunk that includes a corresponding window of overlapped frames;

for each subsequent video chunk, discarding a portion of metadata corresponding to the subsequent video chunk to obtain modified metadata corresponding to the subsequent video chunk, wherein the portion discarded is associated with a corresponding window of overlapped frames; and merging each video chunk into a single output video, wherein the first video chunk of the output video is associated with metadata corresponding to the first video chunk, and each subsequent video chunk of the output video is associated with modified metadata corresponding to the subsequent video chunk.

2. The method of claim 1, further comprising:
for each subsequent video chunk, discarding a corresponding window of overlapped frames that is appended to a beginning of the subsequent video chunk before the subsequent video chunk is merged into the output video.

3. The method of claim 1, wherein processing each video chunk in parallel comprises:
applying Infinite Impulse Response (IIR) filtering to each video chunk, wherein, for each subsequent video chunk, the UR filtering is applied to an extended version of the subsequent video chunk that includes a corresponding window of overlapped frames.

4. The method of claim 1, wherein processing each video chunk in parallel comprises:
scanning each video chunk in parallel, wherein, for each subsequent video chunk, a corresponding window of overlapped frames is scanned before the subsequent video chunk is scanned.

5. The method of claim 4, wherein processing each video chunk in parallel comprises:
instantaneously generating metadata with buffered information corresponding to each video chunk in parallel as the video chunk is scanned.

6. The method of claim 1, further comprising:
appending, to the first video chunk, metadata corresponding to the first video chunk; and
appending, to each subsequent video chunk, modified metadata corresponding to the subsequent video chunk.

7. The method of claim 1, wherein processing each video chunk in parallel comprises:
for each subsequent video chunk, determining information relating to a different video chunk immediately preceding the subsequent video chunk based on a corresponding window of overlapped frames, wherein the information reduces visual artifacts in the subsequent video chunk during tone mapping of the output video.

8. A system comprising:
at least one processor; and
a non-transitory processor-readable memory device storing instructions that when executed by the at least one processor causes the at least one processor to perform operations including:
segmenting an input video into a first video chunk and one or more subsequent video chunks, wherein each video chunk comprises a sequence of frames;

for each subsequent video chunk, selecting a subsequence of frames from a different video chunk immediately preceding the subsequent video chunk and appending the subsequence of frames to a beginning of the subsequent video chunk to form an extended version of the subsequent video chunk, wherein the subsequence of frames includes a last frame of the different video chunk, and the subsequence of frames represents a corresponding window of overlapped frames;

generating metadata corresponding to each video chunk by processing each video chunk in parallel, wherein each subsequent video chunk is processed by scanning an extended version of the subsequent video chunk that includes a corresponding window of overlapped frames;

for each subsequent video chunk, discarding a portion of metadata corresponding to the subsequent video chunk to obtain modified metadata corresponding to the subsequent video chunk, wherein the portion discarded is associated with a corresponding window of overlapped frames; and merging each video chunk into a single output video, wherein the first video chunk of the output video is associated with metadata corresponding to the first video chunk, and each subsequent video chunk of the output video is associated with modified metadata corresponding to the subsequent video chunk.

9. The system of claim 8, wherein the operations further comprise:
for each subsequent video chunk, discarding a corresponding window of overlapped frames that is appended to a beginning of the subsequent video chunk before the subsequent video chunk is merged into the output video.

10. The system of claim 8, wherein processing each video chunk in parallel comprises:
applying Infinite Impulse Response (IIR) filtering to each video chunk, wherein, for each subsequent video chunk, the UR filtering is applied to an extended version of the subsequent video chunk that includes a corresponding window of overlapped frames.

11. The system of claim 8, wherein processing each video chunk in parallel comprises:
scanning each video chunk in parallel, wherein, for each subsequent video chunk, a corresponding window of overlapped frames is scanned before the subsequent video chunk is scanned.

12. The system of claim 11, wherein processing each video chunk in parallel comprises:
instantaneously generating metadata with buffered information corresponding to each video chunk in parallel as the video chunk is scanned.

13. The system of claim 8, wherein the operations further comprise:
appending, to the first video chunk, metadata corresponding to the first video chunk; and
appending, to each subsequent video chunk, modified metadata corresponding to the subsequent video chunk.

14. The system of claim 8, wherein processing each video chunk in parallel comprises:
for each subsequent video chunk, determining information relating to a different video chunk immediately preceding the subsequent video chunk based on a corresponding window of overlapped frames, wherein the information reduces visual artifacts in the subsequent video chunk during tone mapping of the output video.

15. A non-transitory processor-readable medium that includes a program that when executed by a processor performs a method comprising:
    segmenting an input video into a first video chunk and one or more subsequent video chunks, wherein each video chunk comprises a sequence of frames;
    for each subsequent video chunk, selecting a subsequence of frames from a different video chunk immediately preceding the subsequent video chunk and appending the subsequence of frames to a beginning of the subsequent video chunk to form an extended version of the subsequent video chunk, wherein the subsequence of frames includes a last frame of the different video chunk, and the subsequence of frames represents a corresponding window of overlapped frames;
    generating metadata corresponding to each video chunk by processing each video chunk in parallel, wherein each subsequent video chunk is processed by scanning an extended version of the subsequent video chunk that includes a corresponding window of overlapped frames;
    for each subsequent video chunk, discarding a portion of metadata corresponding to the subsequent video chunk to obtain modified metadata corresponding to the subsequent video chunk, wherein the portion discarded is associated with a corresponding window of overlapped frames; and
    merging each video chunk into a single output video, wherein the first video chunk of the output video is associated with metadata corresponding to the first video chunk, and each subsequent video chunk of the output video is associated with modified metadata corresponding to the subsequent video chunk.

16. The non-transitory processor-readable medium of claim 15, wherein the method further comprises:
    for each subsequent video chunk, discarding a corresponding window of overlapped frames that is appended to a beginning of the subsequent video chunk before the subsequent video chunk is merged into the output video.

17. The non-transitory processor-readable medium of claim 15, wherein processing each video chunk in parallel comprises:
    applying Infinite Impulse Response (IIR) filtering to each video chunk, wherein, for each subsequent video chunk, the UR filtering is applied to an extended version of the subsequent video chunk that includes a corresponding window of overlapped frames.

18. The non-transitory processor-readable medium of claim 15, wherein processing each video chunk in parallel comprises:
    scanning each video chunk in parallel, wherein, for each subsequent video chunk, a corresponding window of overlapped frames is scanned before the subsequent video chunk is scanned.

19. The non-transitory processor-readable medium of claim 18, wherein processing each video chunk in parallel comprises:
    instantaneously generating metadata with buffered information corresponding to each video chunk in parallel as the video chunk is scanned.

20. The non-transitory processor-readable medium of claim 15, wherein the method further comprises:
    appending, to the first video chunk, metadata corresponding to the first video chunk; and
    appending, to each subsequent video chunk, modified metadata corresponding to the subsequent video chunk.

* * * * *